United States Patent Office 2,791,244
Patented May 7, 1957

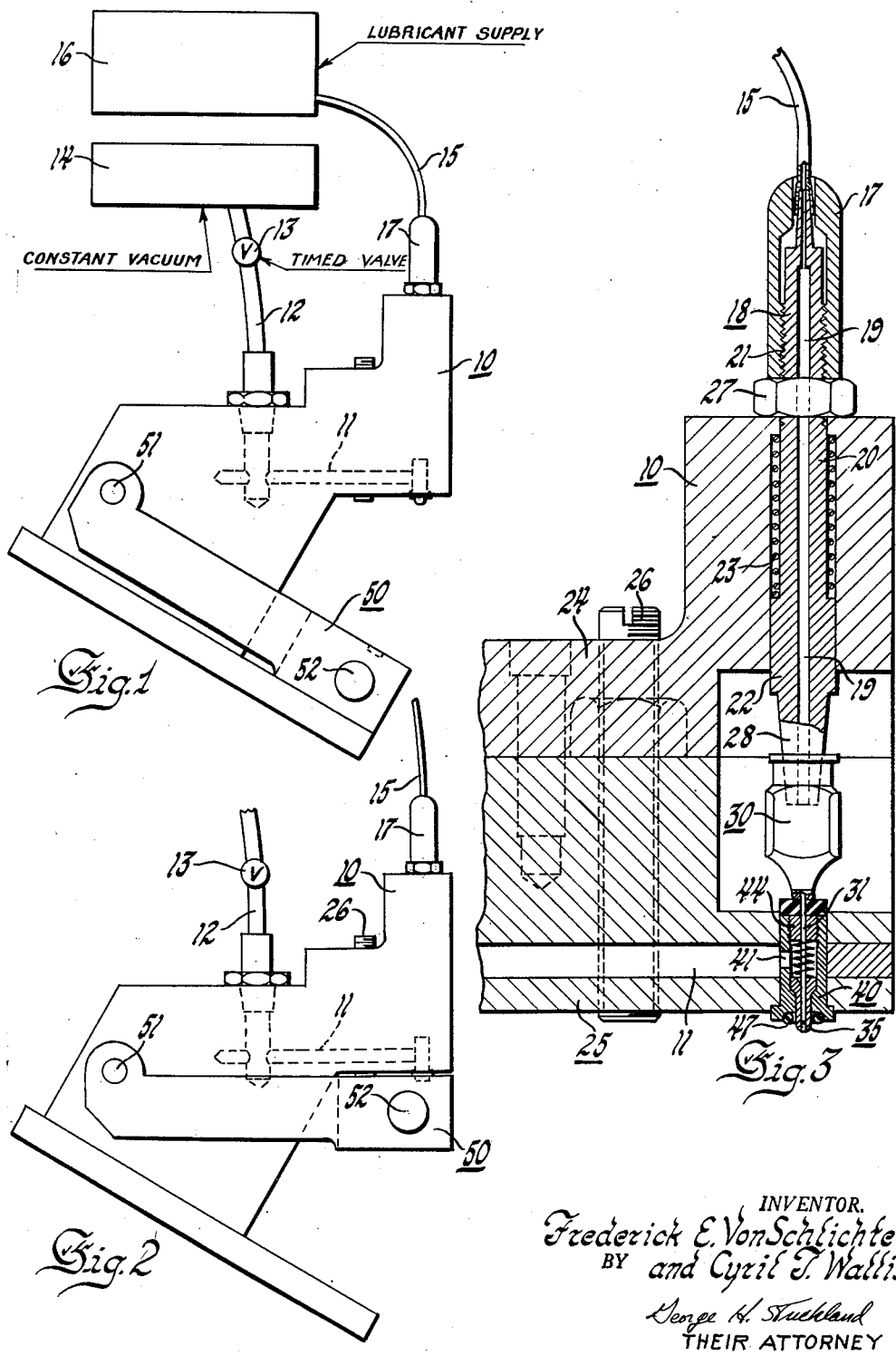

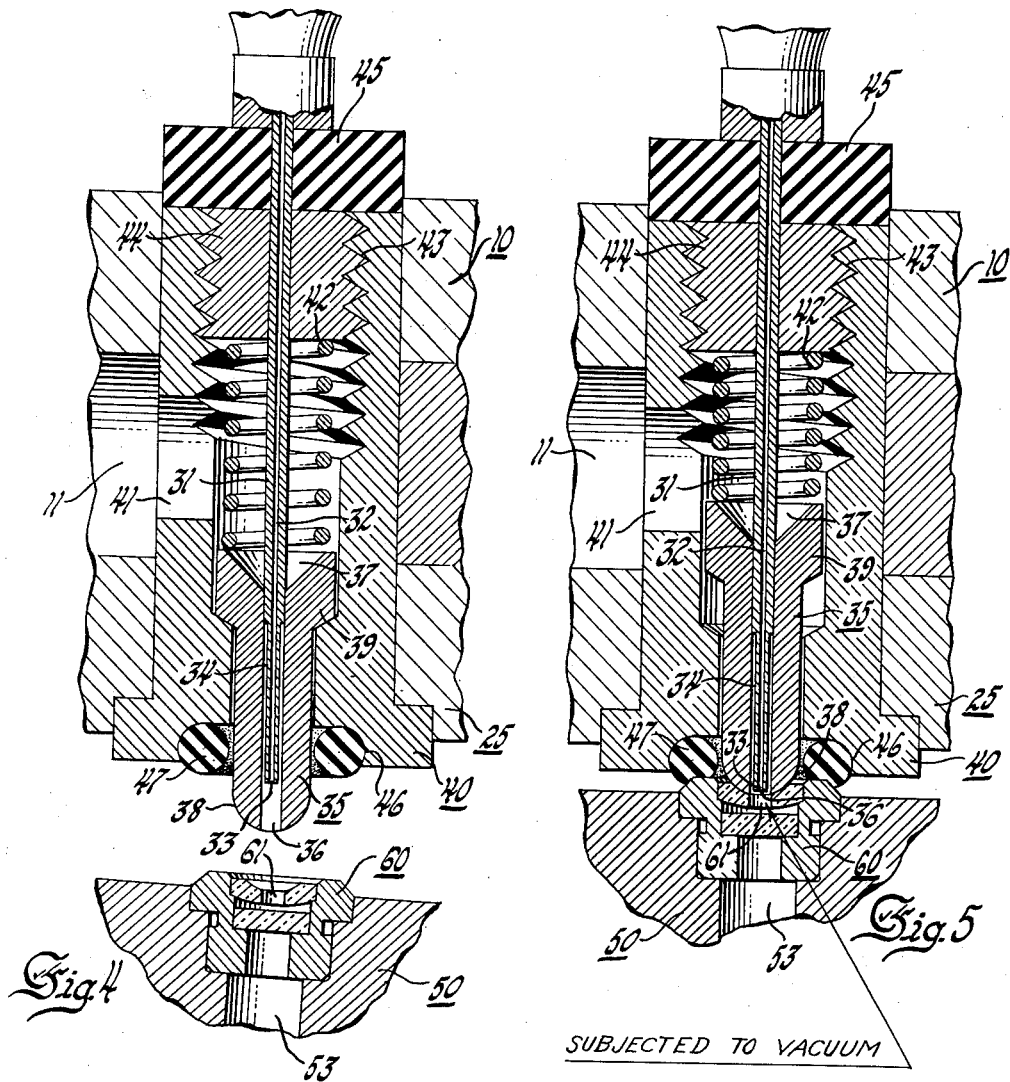

2,791,244

METHOD AND APPARATUS FOR DISPENSING MEASURED QUANTITIES OF LIQUID TO JEWEL BEARINGS

Frederick E. von Schlichten, Rochester, and Cyril T. Wallis, Brockport, N. Y., assignors to General Motors Corporation, Detroit, Mich., a corporation of Delaware Application June 7, 1954, Serial No. 434,762

19 Claims. (Cl. 141—7)

This invention pertains to a method and apparatus for dispensing measured quantities of liquids, and particularly to a method and apparatus for applying measured quantities of liquid lubricant to clock jewels.

Heretofore, it has been the practice to manually apply small quantities of lubricant to clock jewels. This operation was time consuming and expensive. In addition, the quantity of lubricant applied varied over a substantial range. Thus, if insufficient lubricant was applied, the life span of the jewel would be shortened; while if an excess of lubricant was applied, the cost would be unduly increased. This invention relates to a method and apparatus for automatically applying exactly the required quantity of liquid lubricant to precision bearings, such as clock jewels. Accordingly, among our objects are the provision of a method of dispensing measured quantities of liquids; the further provision of apparatus for carrying out the aforesaid method; and the still further provision of a method and apparatus for dispensing measured quantities of liquids including means for establishing a pressure differential between a column of liquid lubricant and a jewel, and means for accurately controlling the time duration of the applied pressure differential.

The aforementioned and other objects are accomplished in the present invention by incorporating a calibrated orifice through which the lubricant flows, and establishing a predetermined pressure differential across the orifice for an accurately timed interval. Specifically, the apparatus includes a lubricant supply tank which is subjected to atmospheric pressure. Liquid lubricant from the tank is supplied through a capillary tube to a precision hypodermic needle having a calibrated discharge orifice. The tank, the capillary tube and the hypodemic needle constitute a liquid column. The hypodermic needle is supported in a stationary fixture having a movable fitting through which the needle extends. The jewel to be oiled is supported in a movable fixture, the jewel being of the character having a centrally disposed, countersunk opening therein. When the movable fixture is positioned in abutting relation with the stationary fixture, the hypodemic needle fixture is depressed and the jewel engages a seal.

The hypodermic needle fitting is loosely received in a guide which is connected by a passage means with a conduit, the conduit being connected to a tank which is maintained at a substantially constant vacuum. The vacuum conduit includes a valve which may be opened for accurately timed intervals so as to subject the jewel opening and the calibrated discharge orifice of the hypodermic needle to the pressure existent in the vacuum tank. Inasmuch as the calibrated discharge orifice of the hypodermic needle is disposed in contiguous relation to the jewel opening, a predetermined quantity of lubricant will be supplied to the jewel due to the pressure differential on opposite surfaces of the oil column for an accurately timed interval.

The method of operation is as follows. When the fixtures are placed in sealing engagement, the vacuum valve is opened for a predetermined interval, thereby reducing the pressure to surrounding the calibrated discharge orifice of the hypodermic needle to the pressure of the constant vacuum tank. This establishes a pressure differential on the column of oil and by accurately timing the interval of the pressure differential across the calibrated discharge orifice of the hypodermic needle, the quantity of oil dispensed can be accurately controlled.

Further objects and advantages of the present invention will be apparent from the following dsecription, reference being had to the accompanying drawings wherein a preferred embodiment of the present invention is clearly shown, and wherein silimar reference characters denote similar parts throughout the several views.

In the drawings:

Fig. 1 represents a view, in elevation, of apparatus constructed according to the present invention for carrying out the dispensing method disclosed herein.

Fig. 2 is a fragmentary view, in elevation, similar to Fig. 1 with the movable fixture in abutting relation with the stationary fixture, which conditions prevail during dispensing of the liquid.

Fig. 3 is an enlarged fragmentary view, partly in section and partly in elevation, of the stationary fixture of the apparatus shown in Figs. 1 and 2, the view being taken in a plane parallel to the plane of the drawing.

Fig. 4 is an enlarged fragmentary sectional view of portions of the stationary and movable fixtures of the apparatus shown in Fig. 1, the view being taken in a plane parallel to the plane of the drawing.

Fig. 5 is a view similar to Fig. 4 with the stationary and movable fixtures in abutting relation, the view being taken in a plane parallel to the drawing in Fig. 2.

With particular reference to Figs. 1 and 2, the apparatus includes a stationary fixture 10, and a movable fixture 50 which is pivotally supported at 51 on the stationary fixture 10. The movable fixture includes a handle 52, which may be manually grasped so as to move the fixture 50 in abutting relation with the fixture 10, as depicted in Fig. 2. The stationary fixture 10 is formed with internal passage means 11, which communicate with a conduit 12 having valve means 13 therein, the conduit also having communication with a tank 14, which is maintained at a substantialy constant vacuum by any suitable means such as a motor driven vacuum pump, not shown. The valve means 13 may be opened for accurately timed intervals so as to subject the passage means 11 to the vacuum maintained within the tank 14. The valve means 13 may be operated by any suitable means, such as a solenoid, not shown.

The stationary fixture 10 is also connected by a capillary tube 15 to a liquid lubricant supply tank 16, which is subjected to atmospheric pressure. One end of the capillary tube 15 extends into a housing 17. With reference to Fig. 2, it may be seen that the end of the capillary tube 15 disposed within the housing 17 is connected to a fitting 18 having an opening 19 therethrough. The tubular portion 20 of the fitting 18 is formed with an exterior shoulder 22 against which one end of a coil spring 23 is seated. The other end of the coil spring 23 abuts a shoulder formed on a portion of the stationary fixture 10.

Reference to Fig. 3 will also indicate that the stationary fixture 10 comprises upper and lower members 24 and 25 which are retained in assembled position by any suitable means, such as bolts. The upper member 24 supports the tubular member 21, while the lower member 25 is formed with the vacuum passage means 11. In addition, the two members 24 and 25 are interconnected by a threaded stud 26 which projects through the bottom surface of the member 25, thereby forming a stop.

The fitting 18 includes an exteriorly threaded portion 21, which is received by a nut 27 for maintaining the fitting 18 and the member 24 in assembled relation. The fitting 18 is also formed with a tapered end portion 28, which is adapted to be snugly received in the inlet of a hypodermic needle, designated generally by the numeral 30. In a conventional manner, the hypodermic needle 30 includes a slender tubular portion 31 having a calibrated opening 32 therein, which terminates in a calibrated discharge orifice 33, as seen in Figs. 4 and 5.

With particular reference to Figs. 4 and 5, it may be seen that a portion 34 of the tubular needle 31 is of lesser external diameter than the remaining portion thereof. It may also be seen that the entire reduced diameter portion 34 is disposed within a reciprocal fitting 35, which is loosely received within a housing 40 having an opening 41 which communicates with the suction passage 11. The fitting 35 is formed with a centrally disposed opening 36 which is countersunk at 37, the exposed end of the fitting 35 having a hemispherical end 38. The fitting 35 is retained in assembled relation with the housing 40 by reason of an external annular shoulder 39. In addition, the fitting 35 is biased outwardly by means of a compression spring 42, which abuts the inner end thereof, the spring 42 being disposed within the housing 40.

The housing 40 is press fitted into the lower member 25 of the stationary fixture. Furthermore, the housing 40 is formed with an interiorly threaded portion 43, which receives an exteriorly threaded plug 44 having a central opening therethrough for receiving the hypodermic needle. In addition, as shown in Figs. 3, 4 and 5, the base of the hypodermic needle engages a rubber-like sealing element 45. The exposed end of the housing 40 is formed with a circular recess 46 within which a rubber O-ring 47 is retained, the purpose of which will be described more particularly hereinafter.

The movable fixture 50 is formed with an opening 53, the axis of which is arranged to be in alignment with the axis of the hypodermic needle 30 when the two fixtures 10 and 50 are placed in abutting relation, as depicted in Fig. 2. The opening 53 includes a counterbored portion 54, which is accurately sized to receive a precision clock jewel 60. The clock jewel 60 is of conventional design and includes a countersunk centrally disposed openign 61 of extremely small size, within which a predetermined quantity of liquid lubricant is to be dispensed.

The method of dispensing measured quantities of liquid lubricant, such as oil, on the precision clock jewels 60 with the apparatus hereinbefore described, is as follows. Initially, a jewel 60 is positioned in the countersunk opening 54. Then the operator grasps the handle 52 and moves the fixture 50 into abutting relation with the fixture 10, as shown in Figs. 2 and 5. It should be noted that the stud 26, which projects through the bottom surface of the member 25 of the stationary fixture 10 acts as a stop. Furthermore, when the fixtures 10 and 50 are in abutting relation, as shown in Fig. 5, the O-ring seal 47 will engage the jewel 60 so as to seal the end of the hypodermic needle 30 from atmosphere. It should further be noted that when the fixtures 10 and 50 are moved into abutting relation, as shown in Fig. 5, the fitting 35 is depressed by being moved upwardly into the housing 40. However, by reason of the countersunk opening 61 in the jewel, the discharge orifice 33 has communication with the vacuum passage 18 through the opening 41, the annular space between fitting 35 and the bore of housing 40 and the annular space between the hemispherical tip 38 and the countersunk opening 61. Thus, if the valve means 13 is opened for a predetermined and accurately timed interval, it will be appreciated that the column of oil between the tank 16 and the discharge orifice 33 of the hypodermic needle 30 will be subjected to a predetermined pressure differential which will cause a predetermined and accurately measured quantity of oil to be dispensed from the hypodermic needle and deposited on the jewel 60.

While the embodiment of the present invention as herein disclosed, constitutes a preferred form, it is to be understood that other forms might be adopted.

What is claimed is as follows:

1. The method of dispensing a measured quantity of liquid which comprises the steps of, establishing a column of liquid in a tube having a calibrated discharge orifice at one end, providing a first pressure, connecting the other end of said tube to said first pressure, providing a second, lower pressure, and connecting the second pressure to the discharge orifice for a predetermined time interval.

2. The method of dispensing a measured quantity of liquid which comprises the steps of, establishing a column of liquid in a tube having a calibrated discharge orifice at one end, connecting the other end of said tube to atmospheric pressure, providing a source of substantially constant subatmospheric pressure, and connecting said subatmospheric pressure to the discharge orifice for a predetermined time interval.

3. The method of dispensing a measured quantity of liquid from a column of liquid in a tube having a calibrated discharge orifice at one end, which comprises the steps of, providing a first pressure, connecting the other end of said tube to said first pressure, providing a second, lower pressure, and connecting the second pressure to the discharge orifice for a predetermined time interval.

4. The method of dispensing a measured quantity of liquid from a column of liquid in a tube having a calibrated discharge orifice at one end, which comprises the steps of, connecting the other end of the tube to atmospheric pressure, providing a source of substantially constant subatmospheric pressure, and connecting the subatmospheric pressure to the discharge orifice for a predetermined time interval.

5. The method of dispensing a measured quantity of liquid from a column of liquid in a tube having a calibrated discharge orifice at one end, which is subjected to a first pressure, the other end of the tube being subjected to a second, higher pressure than said first pressure, which comprises the steps of, accurately timing the interval to which the calibrated orifice is subjected to the said first pressure.

6. The method or dispensing liquid lubricant to a precision bearing from a column of liquid lubricant in a tube having a calibrated discharge orifice at one end, which comprises the steps of, providing a first pressure, connecting the other end of the tube to said first pressure, providing a second, lower pressure, connecting the calibrated discharge orifice in the region of said bearing to said second pressure, and accurately timing the interval during which the discharge orifice is connected to the said second pressure.

7. Apparatus for dispensing a measured quantity of liquid including, a tank of liquid subjected to a first pressure, means connecting said tank with a calibrated discharge orifice so as to form a column of liquid, a source of pressure lower than said first pressure, means to connect and disconnect the lower pressure to the calibrated orifice, and timing means to limit said last recited connecting means to a predetermined time interval.

8. Apparatus for dispensing a measured quantity of liquid including, a tank of liquid subjected to a first pressure, means connecting said tank with a calibrated discharge orifice so as to form a column of liquid, said connecting means including a capillary tube, a source of pressure lower than said first pressure, means to connect and disconnect the lower pressure to the calibrated orifice, and timing means to limit the last recited connecting means to a predetermined time interval.

9. Apparatus for dispensing a measured quantity of liquid including, a tank of liquid subjected to atmospheric pressure, means connecting said tank with a calibrated discharge orifice so as to form a column of liquid, a source of substantially constant subatmospheric pressure, means to connect and disconnect the subatmospheric pressure to a calibrated discharge orifice, and timing means to limit said last recited connecting means to a predetermined time interval.

10. Apparatus of the character set forth in claim 9 wherein said last recited means includes a valve.

11. Apparatus for oiling precision bearings including, a tank of liquid lubricant subject to a first pressure, means connecting said tank with a calibrated discharge orifice so as to form a column of liquid lubricant, a source of pressure lower than said first pressure, means including a valve for connecting and disconnecting the calibrated discharge orifice to said second pressure, and timing means to limit said last recited connecting means to a predetermined time interval.

12. Apparatus for applying liquid lubricant to precision bearings, including in combination, a stationary fixture, a tank of lubricant subjected to atmospheric pressure, means connecting said tank with a calibrated discharge orifice, a source of substantially constant subatmospheric pressure, a movable fixture for supporting a precision bearing, means for connecting and disconnecting said discharge orifice to said subatmospheric pressure when the two fixtures are positioned so that the calibrated orifice is located in contiguous relation to the precision bearing, and timing means to limit said last recited connecting means to a predetermined time interval.

13. The combination set forth in claim 12 wherein said means connecting the tank with the calibrated discharge orifice includes a capillary tube, and wherein said calibrated discharge orifice is constituted by the outlet of a hypodermic needle.

14. Apparatus for applying liquid lubricant to precision bearings, including in combination, a stationary fixture, a tank of lubricant subjected to atmospheric pressure, a capillary tube connecting said tank with a calibrated discharge orifice, said calibrated discharge orifice comprising the outlet of a hypodermic needle which projects into a reciprocable fitting carried by said stationary fixture, said reciprocable fitting being carried by a member arranged to sealingly engage a precision bearing, a source of substantially constant subatmospheric pressure, a movable fixture for supporting said precision bearing, means to connect and disconnect said discharge orifice to said subatmospheric pressure when said two fixtures are positioned so that the calibrated orifice is located in contiguous relation to said precision bearing, and timing means to limit said connecting means to a predetermined time interval.

15. Apparatus for applying liquid lubricant to precision bearings, including in combination, a first fixture, a tank of liquid lubricant subject to atmospheric pressure, a source of subatmospheric pressure, means connecting said tank with a calibrated discharge orifice, said calibrated discharge orifice comprising the outlet of a hypodermic needle which projects into a reciprocable fitting supported by said first fixture, said fitting being carried by a member arranged to sealingly engage a precision bearing, a second fixture for supporting said precision bearing, said first and second fixtures being arranged for relative movement, means to connect and disconnect the outlet of said hypodermic needle to said subatmospheric pressure when the two fixtures are positioned so that the outlet of said hypodermic needle is located in contiguous relation to said precision bearing, and timing means to limit said last recited connecting means to a predetermined time interval.

16. The apparatus set forth in claim 15 wherein said fitting is coaxially disposed with respect to said hypodermic needle.

17. The apparatus set forth in claim 15 wherein said fitting and said hypodermic needle are telescopically arranged.

18. The apparatus set forth in claim 15 wherein said fitting is spring biased to project outwardly of said first fixture when said first and second fixtures are separated.

19. The apparatus set forth in claim 15 wherein said member carries a rubber seal arranged to engage said precision bearing.

References Cited in the file of this patent
UNITED STATES PATENTS

| | | |
|---|---|---|
| Re. 23,830 | Mojonnier | May 18, 1954 |
| 1,842,134 | Waite | Jan. 19, 1932 |
| 2,426,546 | Boswell | Aug. 26, 1947 |
| 2,428,598 | Weaver | Oct. 7, 1947 |
| 2,520,278 | Freeman | Aug. 29, 1950 |
| 2,742,187 | Patzer | Apr. 17, 1956 |